(12) United States Patent
Sagal et al.

(10) Patent No.: US 8,417,954 B1
(45) Date of Patent: Apr. 9, 2013

(54) INSTALLATION IMAGE INCLUDING DIGITAL SIGNATURE

(75) Inventors: Abdullah Metin Sagal, Roseville, CA (US); Luis Astudillo Pascual, Jr., Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 12/369,537

(22) Filed: Feb. 11, 2009

(51) Int. Cl.
*H04L 9/32* (2006.01)
*G06F 7/04* (2006.01)

(52) U.S. Cl. .......................... 713/176; 726/30

(58) Field of Classification Search .................. None
See application file for complete search history.

(56) References Cited

U.S. PATENT DOCUMENTS

| | | | | |
|---|---|---|---|---|
| 5,802,175 A * | 9/1998 | Kara | ............................. | 380/277 |
| 5,898,779 A * | 4/1999 | Squilla et al. | ................. | 713/176 |
| 6,463,535 B1 * | 10/2002 | Drews | ........................... | 713/176 |
| 6,587,842 B1 * | 7/2003 | Watts | ............................... | 705/57 |
| 6,738,905 B1 * | 5/2004 | Kravitz et al. | ................ | 713/194 |
| 6,778,668 B1 * | 8/2004 | Nielsen | .......................... | 380/201 |
| 6,976,166 B2 * | 12/2005 | Herley et al. | ................. | 713/165 |
| 7,522,732 B2 * | 4/2009 | Whitehead | ..................... | 380/286 |
| 7,539,867 B2 * | 5/2009 | Bolosky et al. | ............... | 713/175 |
| 7,685,596 B1 * | 3/2010 | Webb et al. | .................... | 717/177 |
| 7,840,815 B2 * | 11/2010 | Kakehi | ......................... | 713/176 |
| 7,974,411 B2 * | 7/2011 | Krishnapuram et al. | ..... | 380/239 |
| 2003/0088783 A1 * | 5/2003 | DiPierro | ........................ | 713/189 |
| 2005/0188199 A1 * | 8/2005 | Smith et al. | .................... | 713/165 |
| 2006/0100888 A1 * | 5/2006 | Kim et al. | ......................... | 705/1 |
| 2007/0005956 A1 * | 1/2007 | Zilinskas et al. | ............... | 713/156 |
| 2007/0214453 A1 | 9/2007 | Dive-Reclus | | |
| 2008/0052752 A1 * | 2/2008 | Jeffery | .......................... | 725/118 |
| 2008/0126800 A1 * | 5/2008 | Guo et al. | ...................... | 713/167 |
| 2008/0148067 A1 * | 6/2008 | Sitrick et al. | ................... | 713/193 |

* cited by examiner

*Primary Examiner* — Nathan Flynn
*Assistant Examiner* — Abdullah Almamun

(57) ABSTRACT

A system includes a source including a memory storing: at least two encrypted files making up an installation image, each file encrypted with a key; a metadata file including an index to each key and a hash value for each encrypted file; a signature file providing a digital signature for the metadata file, the metadata file digitally signed with a private certificate; and a public certificate associated with the private certificate.

15 Claims, 7 Drawing Sheets

INSTALLATION IMAGE INCLUDING DIGITAL SIGNATURE

BACKGROUND

Code signing provides a digital signature for software to confirm or authenticate at a destination that the software is from the specified source and that the code has not been altered or corrupted. Typically, a digital signature is used for each file within a software package. Therefore, if a software package includes multiple files, then multiple digital signatures are used to authenticate the software package. Digitally signing multiple files at the source and authenticating the digitally signed files at the destination is time consuming. In addition, each additional file of the software package increases the number of files used for authentication of the software package.

For these and other reasons, a need exists for the present invention.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
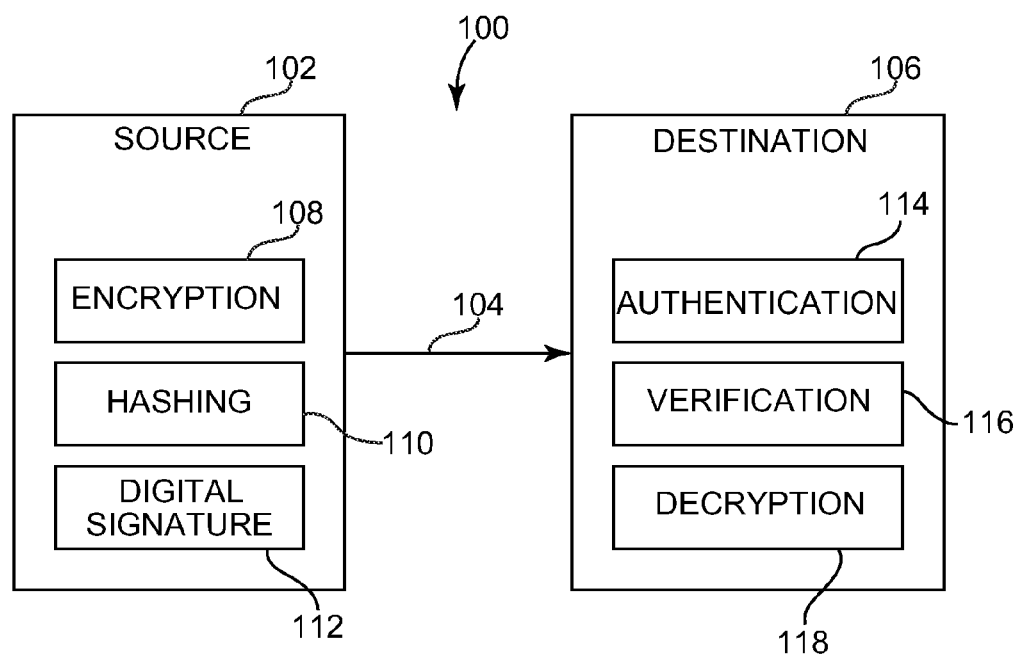
FIG. 1 is a block diagram illustrating one embodiment of a system for transmitting information.

FIG. 1 is a block diagram illustrating one embodiment of a system 100 for transmitting information. System 100 includes a source 102 and a destination 106. Source 102 is communicatively coupled to destination 106 through communication link 104. In one embodiment, communication link 104 includes a wired or wireless communication link. In one embodiment, communication link 104 includes a network communication link, such as an internet communication link. System 100 provides secure transmission of information, such as software or data, from source 102 to destination 106. In one embodiment, source 102 transmits multiple files, which are digitally signed with a single digital signature, to destination 106.

In one embodiment, source 102 includes a web server or other suitable source. Source 102 includes an encryption module 108, a hashing module 110, and a digital signature module 112. Encryption module 108 encrypts files to be transmitted to destination 106. In one embodiment, encryption module 108 encrypts a plurality of files that together provide an installation image to be transmitted to destination 106. In one embodiment, encryption module 108 encrypts each file using a secret symmetric key maintained by source 102 and destination 106.

Hashing module 110 calculates a hash value for each encrypted file encrypted by encryption module 108. In one embodiment, the hash value for each encrypted file and the index or handle to the symmetric key used to encrypt each file is written to a metadata file. In one embodiment, the hash function or functions used to calculate the hash values are maintained by source 102 and destination 106.

Digital signature module 112 digitally signs the metadata file containing the hash values and symmetric key indexes. Digital signature module 112 provides a signature file for the metadata file. The digital signature is based on a secret private certificate maintained by source 102. In one embodiment, source 102 generates public certificates based on the source 102 secret root certificates. A public certificate may be transmitted with the signature file generated using the associated secret root certificate.

In one embodiment, destination 106 is a device on an open architecture platform. In one embodiment, destination 106 is an embedded personal computer (PC) in a network switch or another suitable device. Destination 106 includes an authentication module 114, a verification module 116, and a decryption module 118.

Authentication module 114 receives a metadata file, an associated signature file, and an associated public certificate from source 102. Authentication module 114 checks to determine whether the received public certificate is valid. In one embodiment, authentication module 114 determines whether the received public certificate is valid by comparing it to a list of valid root certificates maintained by destination 106. In one embodiment, in response to determining that the public certificate is invalid, authentication module 114 issues an error message indicating that the public certificate is invalid. In response to determining that the public certificate is valid, authentication module 114 verifies the authenticity of the received metadata file based on the received signature file and the public certificate. In one embodiment, if the authenticity of the metadata file cannot be verified, authentication module 114 issues an error message indicating that the metadata file is not authentic. If the authenticity of the metadata file is verified, destination 106 can be confident that the metadata file was provided by source 102.

Verification module 116 receives the metadata file and the plurality of encrypted files making up the installation image. Verification module 116 calculates the hash value for each of the encrypted files using the hash function or functions maintained by destination 106. For each encrypted file, verification module 116 compares the calculated hash value determined by verification module 116 to the associated hash value stored in the metadata file. If the hash values for each encrypted file match, then the encrypted files have not been corrupted or modified and can be trusted and used by destination 106. If the hash values for each encrypted file do not match, then the encrypted files have been corrupted or modified and cannot be trusted or used by destination 106. In one embodiment, if the hash values for each encrypted file do not match, verification module 116 issues an error message indicating that the encrypted files have been corrupted or modified.

Decryption module 118 receives the metadata file and the plurality of encrypted files making up the installation image. If verification module 116 determines that the encrypted files have not been corrupted or modified, decryption module 118 decrypts each encrypted file. Decryption module 118 decrypts each encrypted file using the secret symmetric key maintained by destination 106 as indicated by the associated index or handle stored in the metadata file for each encrypted file. In one embodiment, once the files making up the installation image are successfully decrypted, the installation image is installed on destination 106.

In operation of one embodiment, source 102 divides an installation image into a plurality of files each including a portion of the installation image. In one embodiment, the size of each file is selected such that each file can be downloaded over a network, such as the internet. In one embodiment, the size of each file is within a range between approximately 100 Mbytes and 300 Mbytes, such as 200 Mbytes. Encryption module 108 then encrypts each of the files using a symmetric key. Hashing module 110 determines the hash value for each file and writes the hash value and the index or handle to the symmetric key used to encrypt each file to a metadata file. Digital signature module 112 then digitally signs the metadata file and provides a signature file for the metadata file. The plurality of encrypted files, the metadata file, the signature file, and a file including the public certificate associated with the private certificate used to generate the signature file are then provided for downloading to destination 106.

In one embodiment, destination 106 downloads the metadata file, the signature file, and the file including the public certificate associated with the private certificate used to generate the signature file. Authentication module 114 determines the authenticity of the metadata file based on the public certificate and the signature file. Once the metadata file is authenticated, destination 106 downloads the plurality of encrypted files for the installation image. Verification module 116 determines whether the encrypted files were corrupted or modified by comparing calculated hash values for the downloaded files to the associated hash values stored in the metadata file. Once the encrypted files are verified as being not corrupted or modified, decryption module 118 decrypts the encrypted files using the symmetric keys indicated by the associated indexes or handles stored in the metadata file. Once the encrypted files are decrypted, the installation image is installed on destination 106.

Figure 2:
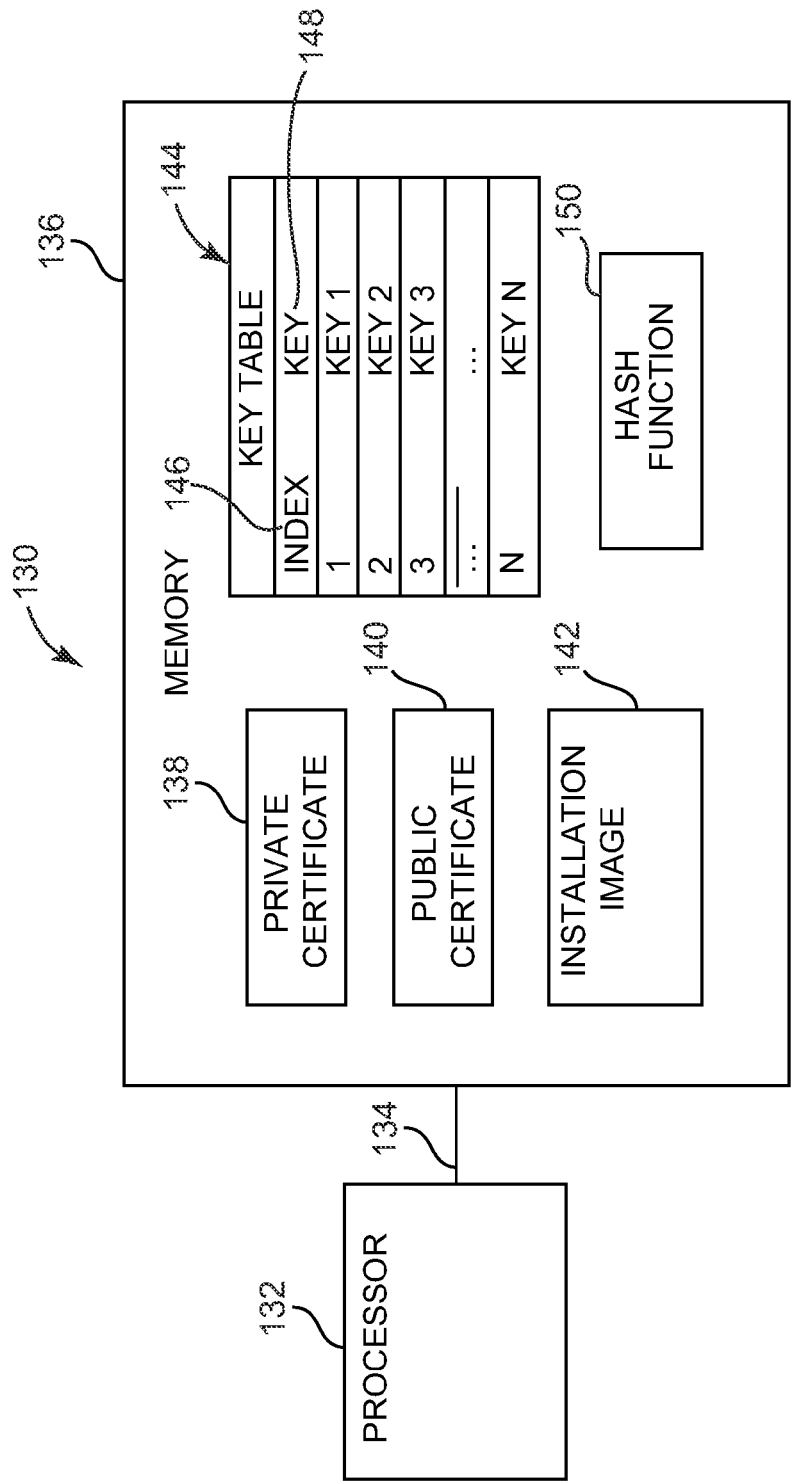
FIG. 2 is a block diagram illustrating one embodiment of a source.

FIG. 2 is a block diagram illustrating one embodiment of a source 130. In one embodiment, source 130 provides source 102 previously described and illustrated with reference to FIG. 1. In one embodiment, source 130 includes a processor 132 and a memory 136. Processor 132 is communicatively coupled to memory 136 through communication link 134. In one embodiment, memory 136 includes any suitable non-volatile memory, such as read-only memory (ROM), magnetic memory, FLASH memory, etc. In one embodiment, memory 136 stores one or more private certificates 138, one or more public certificates 140 each associated with a private certificate 138, one or more installation images 142, a symmetric key table 144, and one or more hash functions 150. Key table 144 includes a suitable plurality (i.e., N) of keys 148 (i.e., KEY 1 through KEY N) where each key 148 includes an index or handle 146 (i.e., 1 through N).

In one embodiment, processor 132 divides installation image 142 into a plurality of files each including a portion of installation image 142. Processor 132 encrypts each of the files using a symmetric key 148 from key table 144. In one embodiment, processor 132 uses a different symmetric key 148 for each file. Processor 132 calculates the hash value for each encrypted file using hash function 150. Processor 132 writes the hash value and the index 146 for each key for each encrypted file to a metadata file. Processor 132 generates a signature file for the metadata file using a private certificate 138. Processor 132 then provides an installation package suitable for download to a destination as indicated in the following FIG. 3.

Figure 3:
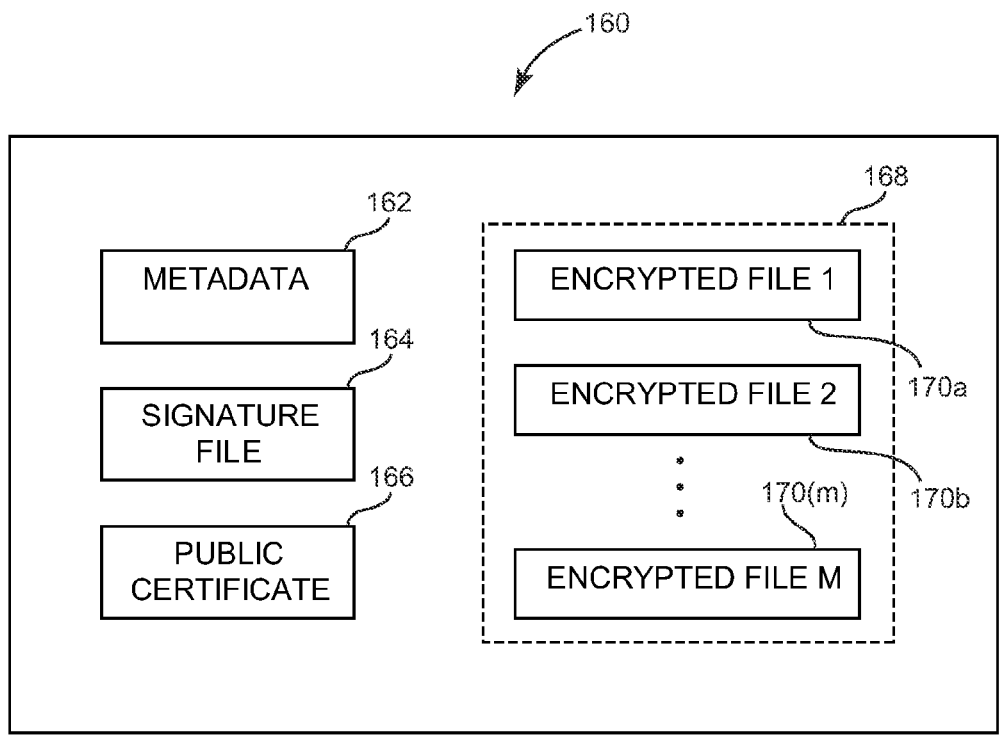
FIG. 3 is a block diagram illustrating one embodiment of an installation package suitable for download to a destination.

FIG. 3 is a block diagram illustrating one embodiment of an installation package 160 suitable for download to a destination. In one embodiment, installation package 160 is stored in memory 136 previously described and illustrated with reference to FIG. 2. In another embodiment, installation package 160 is stored on a web server including a web page accessible by a destination. In another embodiment, installation package 160 is stored on a removable storage medium, such an as a CD-ROM, a FLASH drive, etc. Installation package 160 include a metadata file 162, a signature file 164, a public certificate 166, and encrypted files 168 making up an installation image. Encrypted files 168 include a suitable number (M) of encrypted files 170a-170(m).

Metadata file 162 includes the hash values for each encrypted file 170a-170(m) and the index or handle to the symmetric key used to encrypt each encrypted file 170a-170(m). Signature file 164 provides the digital signature for metadata file 162. Public certificate 166 provides the public certificate associated with the private certificate used to generate signature file 164.

Figure 4:
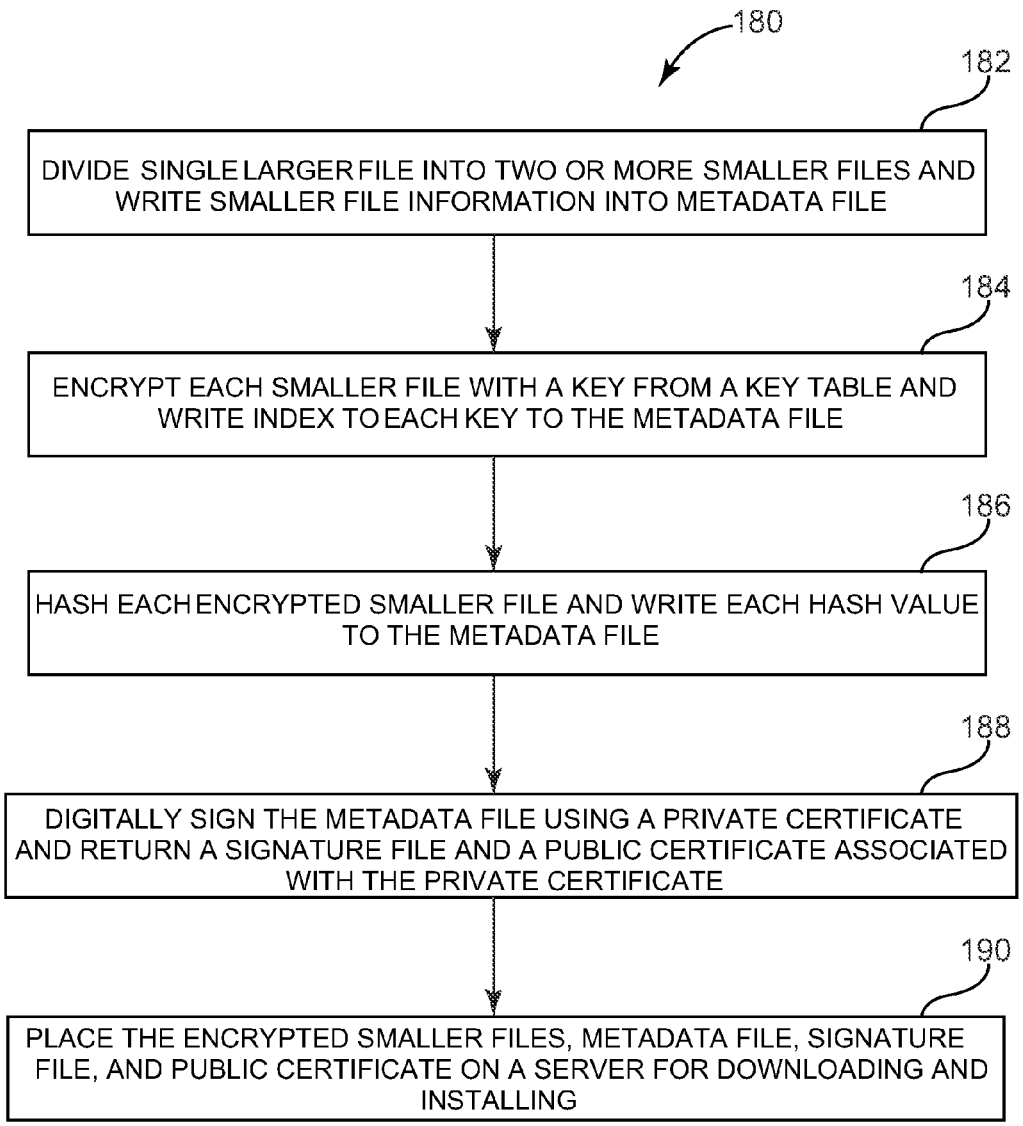
FIG. 4 is a flow diagram illustrating one embodiment of a method for preparing an installation image for downloading to a destination.

FIG. 4 is a flow diagram illustrating one embodiment of a method 180 for preparing an installation image for downloading to a destination. In one embodiment, the installation image is an application. At 182, a single large file containing the application is divided into two or more smaller files. In one embodiment, the size of the smaller files is selected to ease downloading of the files over a network, such as the Internet. Information defining each of the smaller files is written to a metadata file.

At 184, each of the smaller files is encrypted with a key from a key table. In one embodiment, the key table is private to the source of the installation image. By encrypting the files, inspection of the files before downloading and installing the files is prevented. The index to the key used to encrypt each smaller file is written to the metadata file and associated with the respective information defining each of the smaller files. At 186, each of the encrypted files is hashed to determine a hash value for each encrypted file. The hash value for each encrypted file is written to the metadata file and associated with the respective information defining each of the smaller files.

At 188, the metadata file is digitally signed using a private certificate. The signing process returns a signature file and a public certificate associated with the private certificate. The public certificate allows verification of the digital signature. At 190, the encrypted files, the metadata file, the signature file, and the public certificate are placed on a server for downloading and installing.

Figure 5:
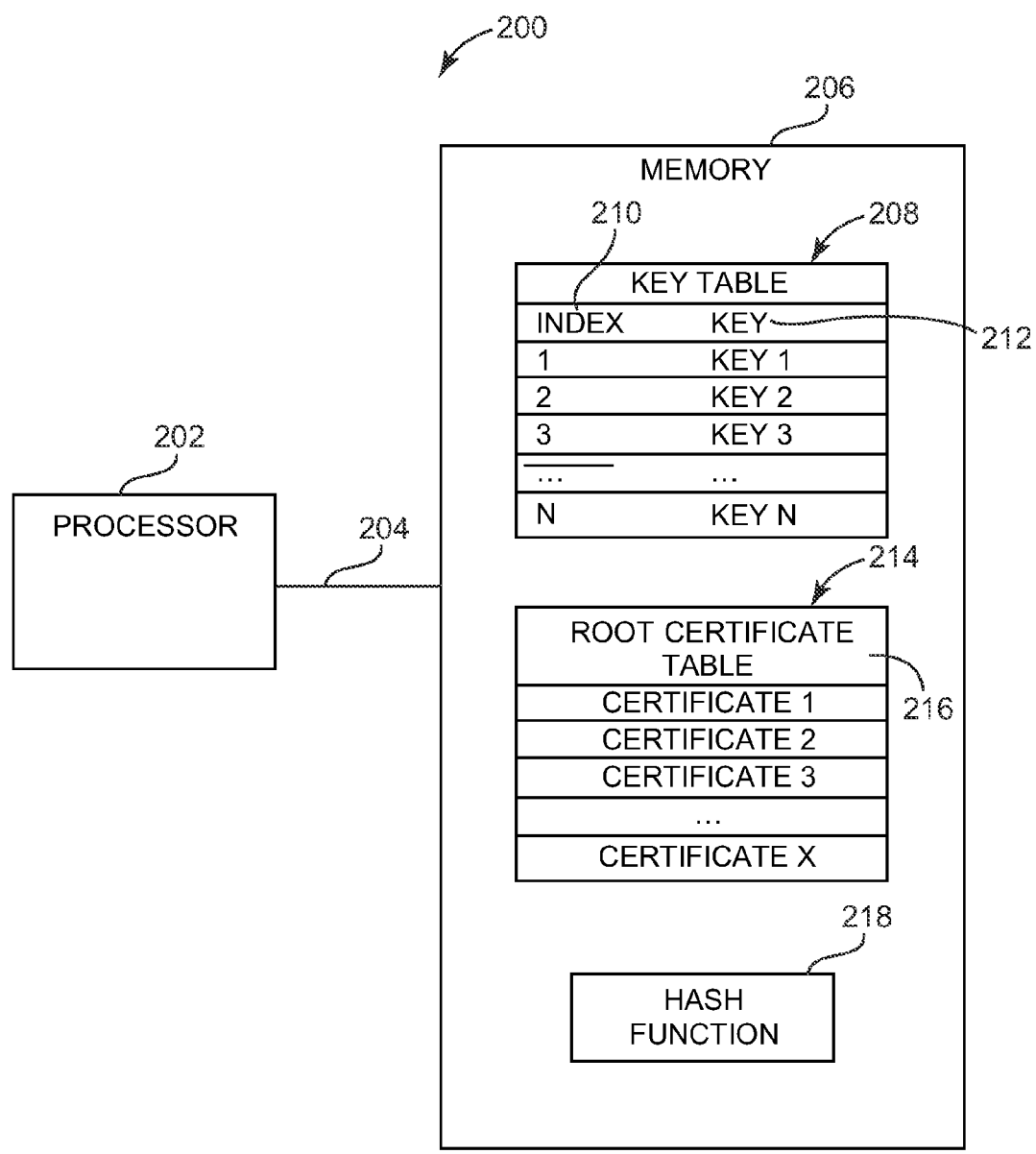
FIG. 5 is a block diagram illustrating one embodiment of a destination.

FIG. 5 is a block diagram illustrating one embodiment of a destination 200. In one embodiment, destination 200 provides destination 106 previously described and illustrated with reference to FIG. 1. In one embodiment, destination 200 includes a processor 202 and a memory 206. Processor 202 is communicatively coupled to memory 206 through communication link 204. In one embodiment, memory 206 includes any suitable non-volatile memory, such as electrically erasable and programmable read only memory (EEPROM), magnetic memory, FLASH memory, etc. In one embodiment, memory 206 stores a symmetric key table 208, a root certificates table 214, and one or more hash functions 218. Key table 208 includes a suitable plurality (i.e., N) of keys 212 (i.e., KEY 1 through KEY N) where each key 212 includes an index 210 (i.e., 1 through N). Root certificates table 214 includes a plurality of root certificates 216 (i.e., certificates 1 through X).

In one embodiment, processor 202 downloads the metadata file, the signature file, and the file including the public certificate associated with the private certificate used to generate the signature file. Processor 202 checks whether the downloaded public certificate matches a certificate 216 in root certificate table 214. If the downloaded public certificate matches a certificate 216 in root certificate table 214, processor 202 verifies the authenticity of the metadata file using the downloaded public certificate and the signature file. If the metadata file is authentic, processor 202 downloads the plurality of encrypted files for the installation image.

Processor 202 then determines whether the encrypted files were corrupted or modified by calculating the hash value for each encrypted file using hash function 218. In one embodiment, hash function 218 matches hash function 150 of source 130 previously described and illustrated with reference to FIG. 2. Processor 202 compares the calculated hash values for the encrypted files to the associated hash values stored in the metadata file. If the hash values match, the encrypted files were not corrupted or modified. Processor 202 then decrypts the uncorrupted and unmodified encrypted files using symmetric keys 212 of key table 208 based on the associated index values stored in the metadata file. In one embodiment, key table 208 matches key table 144 of source 130 previously described and illustrated with reference to FIG. 2. Once the encrypted files are decrypted, processor 202 installs the files to provide an installed image as illustrated below with reference to the following FIG. 6.

Figure 6:
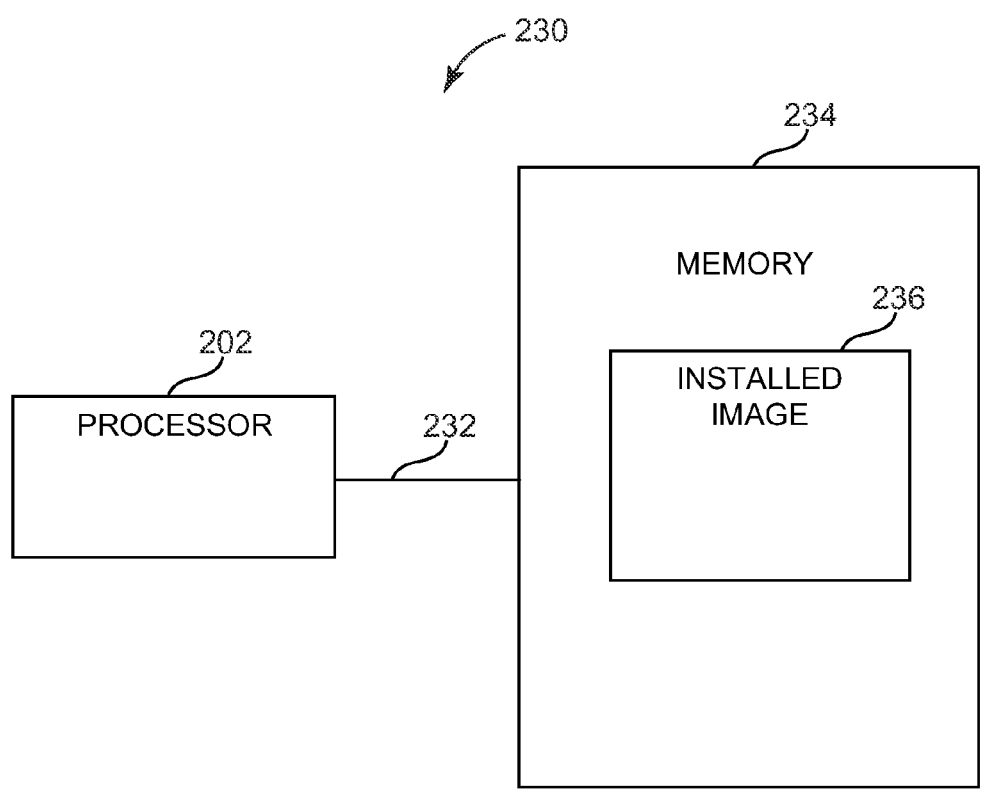
FIG. 6 is a block diagram illustrating one embodiment of a destination including an installed image.

FIG. 6 is a block diagram illustrating one embodiment of a destination 230 including an installed image 236. In one embodiment, destination 230 includes processor 202 and a memory 234. Processor 202 is communicatively coupled to memory 234 through communication link 232. In one embodiment, memory 234 includes any suitable volatile or non-volatile memory, such as a random access memory (RAM), EEPROM, magnetic memory, FLASH memory, etc. In one embodiment, after decrypting the plurality of encrypted files, processor 202 installs the files such that installed image 236 is stored in memory 234. In one embodiment, installed image 236 matches installation image 142 of source 130 previously described and illustrated with reference to FIG. 2.

Figure 7:
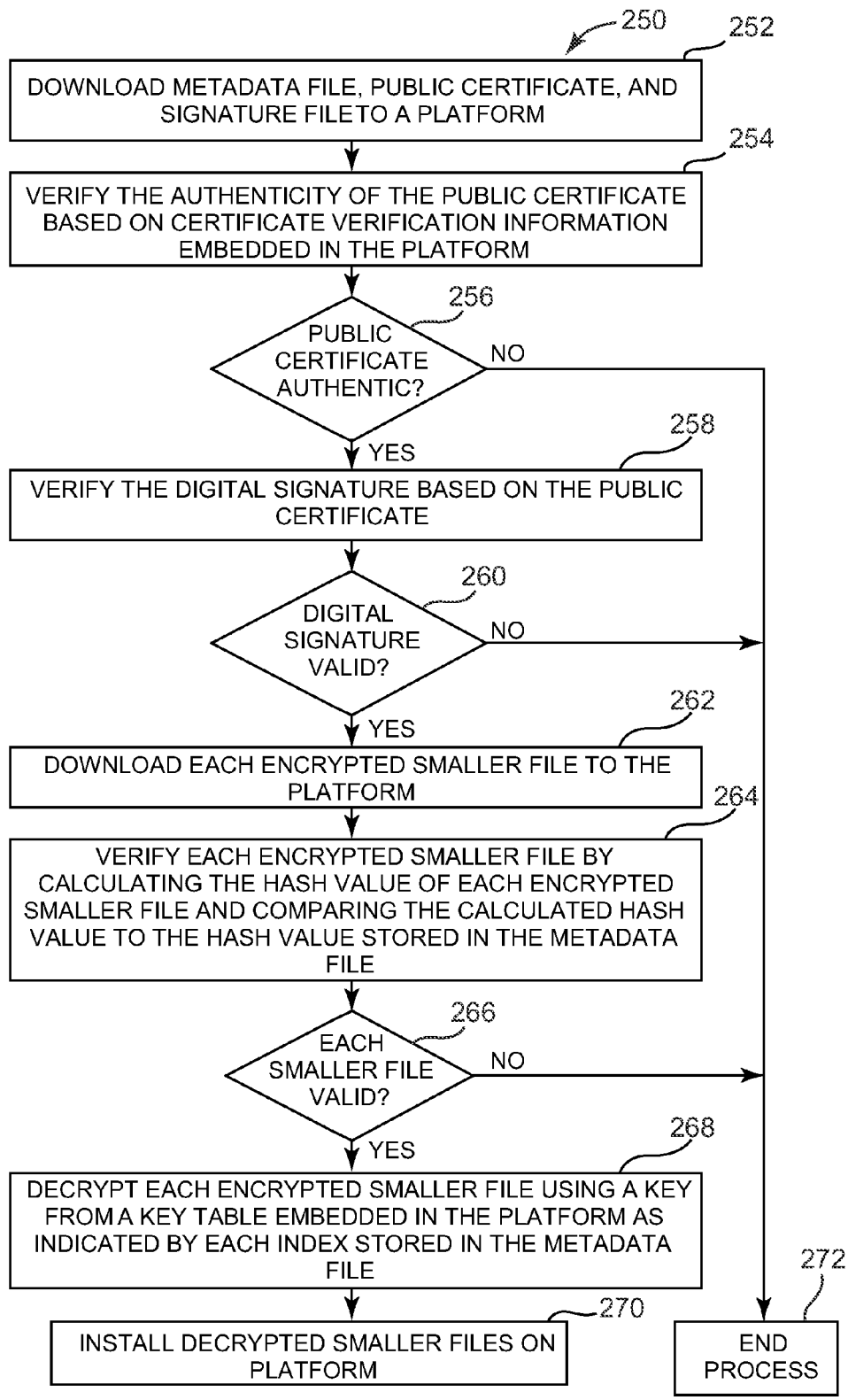
FIG. 7 is a flow diagram illustrating one embodiment of a method for installing an image on a destination.

FIG. 7 is a flow diagram illustrating one embodiment of a method 250 for installing an image on a destination. In one embodiment, the image is an application. At 252, a platform, such as an open architecture (OA) platform, downloads the metadata file, public certificate, and signature file from a server. At 254, the authenticity of the public certificate is verified. The authenticity of the public certificate is verified based on verification information embedded in the platform. At 256, if the public certificate is not authentic, the process ends at 272.

If at 256 the public certificate is authentic, then at 258 the digital signature is verified. The digital signature is verified based on the public certificate. At 260, if the digital signature is not valid, the process ends at 272. If at 260 the digital signature is valid, then at 262 the platform downloads each of the encrypted files. At 264, each encrypted file is verified to determine whether it has been corrupted or modified. Each encrypted file is verified by calculating the hash value of each encrypted file and comparing the calculated hash value to the respective hash value stored in the metadata file. If each of the hash values match, the encrypted files have not been corrupted or modified. At 266, if one or more of the encrypted files is not valid, the process ends at 272.

If at 266 all the encrypted files are valid, then at 268 each of the encrypted files is decrypted. Each of the encrypted files is decrypted using a key from a key table embedded in the platform. The correct key to decrypt each encrypted file is selected from the embedded key table based on the associated index stored in the metadata file. At 270, the decrypted files are installed on the platform.

Embodiments provide a system and method for securely transmitting information, such as software or data, from a source to a destination. In one embodiment, the source encrypts a plurality of files making up the information and digitally signs a file containing information for decrypting and verifying the contents of the plurality of files. The digital signature and the file containing the information for decrypting and verifying the contents of the plurality of files enables a destination to authenticate the plurality of files and verify that the files have not been modified or corrupted. In this way, a single digital signature is used for authenticating more than one file, thereby simplifying and speeding up the process compared to directly digitally signing every file of the plurality of files.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
    a source including a memory, the memory storing:
        at least two encrypted files making up an installation image, wherein each of the at least two encrypted files is encrypted with a key;
        a metadata file including an index to each key and a hash value for each of the at least two encrypted files;
        a signature file providing a digital signature for the metadata file, the metadata file digitally signed with a private certificate; and
        a public certificate associated with the private certificate.

2. The system of claim 1, wherein the source comprises a processor to:
    divide the installation image into at least two files;
    encrypt each of the at least two files with the key to provide the at least two encrypted files;
    determine the hash value for each of the at least two encrypted files;
    generate the metadata file including the index to each key and the hash value for each of the at least two encrypted files; and
    digitally sign the metadata file with the private certificate to provide the signature file.

3. The system of claim 1, wherein the source is communicatively coupled to a destination configured to receive the at least two encrypted files, the metadata file, the signature file, and the public certificate through a network.

4. The system of claim 1, wherein each of the at least two encrypted files comprises between approximately 100 Mbytes and 300 Mbtyes.

5. A system comprising:

a destination including a processor to:

receive at least two encrypted files making up an installation image, wherein each of the at least two encrypted files is encrypted with a key;

receive a metadata file including an index to each key and a hash value for each of the at least two encrypted files;

receive a signature file providing a digital signature for the metadata file, the metadata file digitally signed with a private certificate;

receive a public certificate associated with the private certificate;

authenticate the metadata file based on the signature file and the public certificate;

verify each of the at least two encrypted files based on an associated hash value from the metadata file; and decrypt each of the at least two encrypted files based on an associated index to each key from the metadata file.

6. The system of claim 5, wherein the destination comprises a memory storing a key table including each key used to encrypt each of the at least two encrypted files.

7. The system of claim 5, wherein the processor is to verify that the public certificate is authentic.

8. The system of claim 5, wherein, to verify each of the at least two encrypted files based on the associated hash value from the metadata file, the processor is to:

calculate a hash value for each of the at least two encrypted files;

compare each calculated hash value to the associated hash value from the metadata file; and verify that each of the at least two encrypted files has not been modified in response to each calculated hash value matching the associated hash value from the metadata file.

9. The system of claim 5, wherein the processor is to receive the at least two encrypted files after the metadata file is authenticated.

10. The system of claim 5, wherein the destination comprises an open architecture platform.

11. A method for distributing an installation image, the method comprising:

dividing an installation image into at least two files;

encrypting, by a processor, each of the at least two files with a key;

determining a hash value for each of the at least two encrypted files;

generating a metadata file including a handle to each key and the hash value for each of the at least two encrypted files;

digitally signing the metadata file with a private certificate to provide a signature file; and providing the at least two encrypted files, the metadata file, the signature file, and a public certificate associated with the private certificate.

12. The method of claim 11, further comprising:

receiving the at least two encrypted files, the metadata file, the signature file, and the public certificate;

authenticating the metadata file based on the signature file and the public certificate;

verifying each of the at least two encrypted files based on an associated hash value from the metadata file; and decrypting each of the at least two encrypted files based on an associated handle to each key from the metadata file.

13. The method of claim 11, further comprising:

transmitting the at least two encrypted files, the metadata file, the signature file, and the public certificate through a network.

14. The method of claim 12, wherein verifying each of the at least two encrypted files based on the associated hash value for each encrypted file from the metadata file comprises:

calculating a hash value for each of the at least two encrypted files;

comparing each calculated hash value to the associated hash value from the metadata file; and verifying each of the at least two encrypted files has not been modified in response to each calculated hash value matching the associated hash value from the metadata file.

15. The method of claim 11, further comprising:

downloading the at least two encrypted files, the metadata file, the signature file, and the public certificate to an open architecture platform.

\* \* \* \* \*

UNITED STATES PATENT AND TRADEMARK OFFICE
CERTIFICATE OF CORRECTION

PATENT NO. : 8,417,954 B1
APPLICATION NO. : 12/369537
DATED : April 9, 2013
INVENTOR(S) : Abdullah Metin Sagal et al.

Page 1 of 1

It is certified that error appears in the above-identified patent and that said Letters Patent is hereby corrected as shown below:

In the Claims:

In column 6, line 67, in Claim 4, delete "Mbtyes." and insert -- Mbytes. --, therefor.

Signed and Sealed this
Seventeenth Day of September, 2013

Teresa Stanek Rea
*Deputy Director of the United States Patent and Trademark Office*